United States Patent [19]

Bevan et al.

[11] Patent Number: 4,818,202

[45] Date of Patent: Apr. 4, 1989

[54] HYDRATION MEANS

[75] Inventors: Christopher G. Bevan, Corby; Douglas Hacking, Mowbray, both of England

[73] Assignee: C. G. Bevan Associates Limited, Northamptonshire, England

[21] Appl. No.: 147,991

[22] Filed: Jan. 25, 1988

[30] Foreign Application Priority Data

Jan. 29, 1987 [GB] United Kingdom ................. 8701971

[51] Int. Cl.[4] ......................... B29C 33/80; B28B 1/08; B28B 21/14

[52] U.S. Cl. ...................................... 425/90; 425/262; 425/412; 425/421; 425/424; 425/427; 425/431; 425/432; 425/446

[58] Field of Search ............... 264/DIG. 43; 425/103, 425/404, 412, 421, 445, 446, 456, 90, 92, 262, 253, 424, 452, 447, 432, 431, 457, 427

[56] References Cited

U.S. PATENT DOCUMENTS

| | | | |
|---|---|---|---|
| 1,000,638 | 8/1911 | Stewart | 425/445 |
| 1,123,832 | 1/1915 | Atterbury | 425/262 |
| 1,941,812 | 1/1934 | Muntz | 425/404 |
| 2,529,500 | 11/1950 | Johnson | 425/445 |
| 3,655,842 | 4/1972 | Trautner | 425/117 |
| 4,041,118 | 8/1977 | Ottman et al. | 425/427 |
| 4,042,315 | 8/1977 | Ottman et al. | 425/424 |
| 4,400,149 | 8/1983 | Toffolow et al. | 425/262 |
| 4,708,621 | 11/1987 | Schmidgall et al. | 425/421 |

*Primary Examiner*—Willard Hoag

*Attorney, Agent, or Firm*—Fisher, Christen & Sabol

[57] ABSTRACT

The invention is concerned with an hydration means for wetting the exposed surface of a core void formed on the withdrawal of a core former from a construction panel comprising compacted gypsum or like particulate materials, and proposes the free suspension of a reciprocable spray head by a flexible small-bore tube through which a setting liquid is applied to the spray head from a cross-head with which the tube is connected in fluid flow relationship. If necessary, the spray head may be weighted, while an apertured guide plate through which the tube passes may be provided above the upper limit of movement of the spray head.

11 Claims, 1 Drawing Sheet

HYDRATION MEANS

The invention concerns hydration means, and has particular, though not exclusive, reference to hydration means for use in wetting exposed core surfaces in the manufacture of cored construction products from compacted gypsum or like particulate materials.

In UK-A-2183200 we have described and illustrated a method for the manufacture of, inter alia, a cored construction product from a mixture of fibres and particulate material, the dry mixture being applied to a mould and being compacted in such mould by a combination of vibration and pressure. A setting liquid is applied to the exposed surface of core voids formed on withdrawal of core formers present in the mould during the filling and compaction stages of the process, the liquid being applied as a spray by an hydration means reciprocable along the axis of the core void.

Whilst the exposed compaction powder surface is stable, it is easily damaged, and thus it is necessary not only that the reciprocating hydration means apply the setting liquid in equal amounts to the whole of the surface in such a manner as will avoid surface damage due to liquid impinging thereon but also that contact between the hydration means and the surface be avoided.

There are building panel applications for the method of the patent application aforesaid wherein the core void width may be as little as 25 mm for panel lengths of up to 3000 mm. At these slenderness ratios existing hydration methods are not practical without excessive reduction in reciprocating speed.

In order to meet these requirements it has hitherto been thought necessary that the delivery pipes to which the hydration means are attached be sufficiently stiff and well connected to the reciprocating means to prevent significant lateral movement of the pipes during reciprocation. Such movement, or oscillation, can be induced by inaccuracies in the slide mechanism, and occur particularly at the end of each stroke where motion of the hydration means needs to be sharply reversed to avoid over-wetting the powder in this vicinity. Small movements at the fixed end pipe can also be amplified at the free end by resonant oscillations sufficient to cause damage to the powder surface in the core void. Furthermore, considerable accuracy is required in the manufacture of both the pipes and the slide mechanism, as small inaccuracies at the fixed end of the pipe are magnified by the free length of the pipe.

Although the aforesaid oscillations can be kept within acceptable limits by good design, for some applications of the process the length of the core void in relation to the width of the void is such as to make difficult the obtaining of a stiffness sufficient to prevent damaging lateral oscillations without a reduction in the reciprocating speed of the hydration means. Whilst a reduction in speed gives rise to a reduction in lateral oscillations, such reduction has the adverse effect of increasing powder erosion, since the time during which the spray impinges on each part of the core void is increased.

The object of the present invention is to provide an hydration means capable of maintaining a stable reciprocatory motion along an accurate vertical path for a wide range of product applications.

According to the present invention there is proposed, in or for apparatus for use in the manufacture of cored construction products formed from dry particulate materials, the apparatus comprising a mould, a mould cavity defined by the mould, an elongate core former removably engageable with the mould cavity along a vertical axis thereof, and vibration means operable on the mould to compact or pre-compact dry particulate materials, and any fibres provided therein, present in the mould, an hydration means adapted to apply setting liquid to a surface formed in the dry particulate material on withdrawal of the core former, the hydration means comprising a freely suspended hydration head reciprocable along a path coincident with the vertical axis aforesaid and adapted to receive setting liquid from a supply thereof and deliver the same as a spray to the said surface.

According to a preferred feature, the hydration head is suspended by a flexible small bore tube through which setting liquid is fed to the said head.

According to a further preferred feature, the hydration means further includes a guide means freely to receive the element by which the hydration head is suspended, the said guide means being located adjacent to the retracted position of the hydration head.

The principle behind the method is to achieve accurate vertical movement of the spray nozzle by allowing the latter to hang freely as if it were a plumb bob. This is in direct contradistinction to earlier methods, which relied upon maximum stiffness to achieve control. By its very nature the plumb bob is precisely self-aligning in both vertical planes, and the use of a very flexible delivery tubes with weighted ends damps out the lateral oscillations which are a noticeable feature of alternative, more rigid systems. This damping effect is surprising in view of the sharp reversal at the end of each stroke, and the complete lack of lateral restraint when the nozzles are at the bottom on their stroke. It should be noted that the guide means referred to earlier has no restraining effect when the nozzles are in this position, as the guide is located at the top of the mould and is remote from the freely hanging nozzles at the bottom of the mould. The guide does, however, have an increasing restraining effect as the nozzles move upwards, nozzles are then stabilised completely before the next downstroke so that any slight oscillation which may be induced cannot develop progressively with subsequent strokes.

BRIEF DESCRIPTION OF THE DRAWINGS

The invention will now be described further, by way of example only, with reference to the accompanying drawings illustrating one embodiment thereof and in which.

Figure 1:
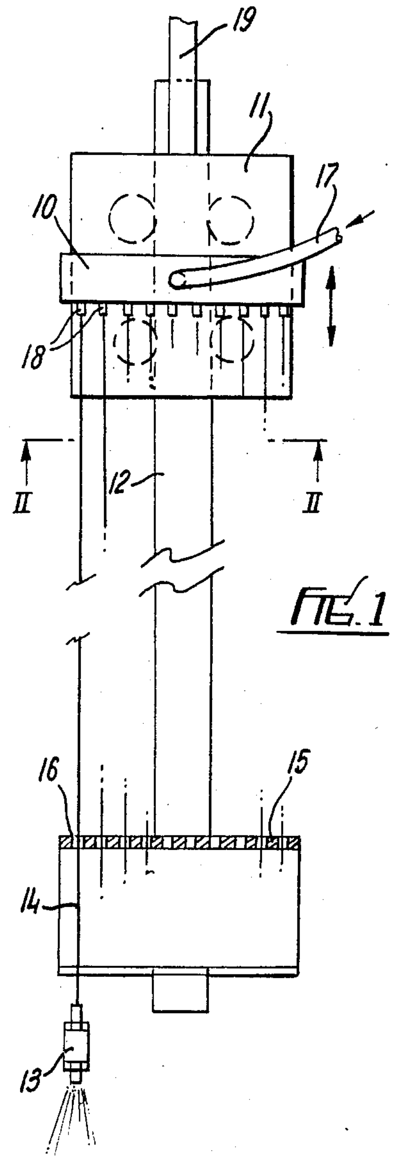
FIG. 1 is a diagrammatic front elevation of an hydration means for the simultaneous wetting of the walls of a multiplicity of spaced side-by-side cores in a cored product; the hydration means being shown in its uppermost, or retracted, position.
Figure 2:
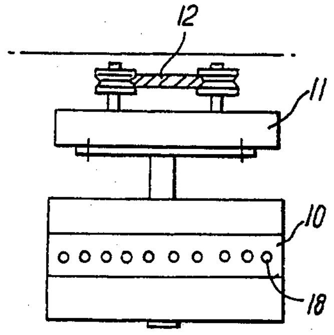
FIG. 2 is a section on line II—II of FIG. 1.
Figure 3:
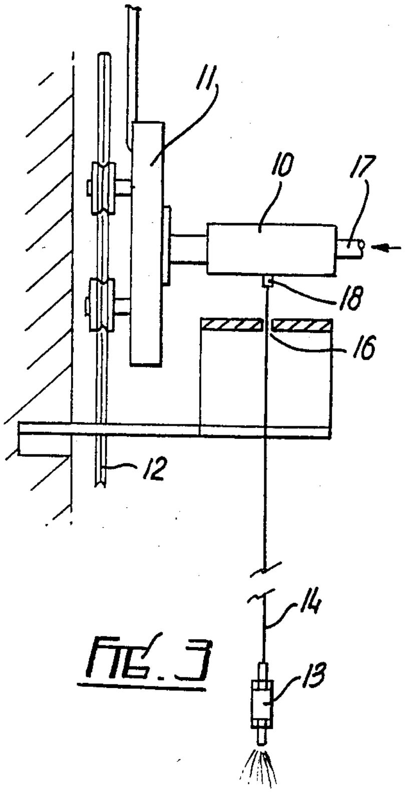
FIG. 3 is a diagrammatic side elevation of a part of the arrangement shown in FIG. 1, the hydration means being shown in its lowermost position.

Referring now to the drawings, an hydration means for applying a setting liquid to the surfaces of vertically extending side-by-side cores in a compacted body of dry particulate material comprises a manifold 10 mounted on a wheeled carriage 11 movable longitudinally of a vertical guide bar 12, the manifold 10 supporting a multiplicity of hydration heads 13 in depending disposition thereon, each hydration head 13 being attached to the cross-head 10, in fluid flow relationship therewith, by a respective flexible small bore tube 14.

A fixed guide plate 15 is provided transversely of the guide bar 12 and adjacent the lower end thereof, the guide plate 15 being arranged in parallel disposition relative to the cross head 10 and having apertures 16 therein equal in number to the number of hydration heads 13, each tube 14 passing through a respective aperture 16 and supporting the related hydration head 13 at that side of the guide plate 15 remote from the manifold 10.

Manifold 10 is connected with a source of setting liquid through feed pipe 17, whilst the individual tubes 14 are secured to the cross-head in fluid flow relationship therewith through suitable gland couplings 18.

Each hydration head 13 has an aperture spray face 19 at the underside thereof, the apertures being dimensioned and arranged, having regard to the line pressure of the setting liquid, to give a downwardly and outwardly directed spray of atomised liquid.

Tube 14, which tube can be in excess of three meters in length, is typically of nylon and will have a bore of, say, 3 mm. In use the tube will be subjected both to elevated temperatures, say 50° C. to 100° C., and to high pressures, delivery pressures of up to 100 psi possibly being required to ensure proper atomisation at the aperture size involved, and the material of the tube will be selected accordingly.

In use in simultaneously wetting the individual core surfaces of a dry compacted body of particulate material, say in the manufacture of a glass fibre reinforced gypsum wall panel by the method disclosed in our copending British patent application No. 8626685, the panel typically being 2.4 meters high, 0.6 meters wide and 40 mm thick, the cross head 10 is raised to its uppermost position above the compacted material existing in the mould, the individual hydration heads are arranged above and in alignment with a respective one of the core voids formed on withdrawal of the core formers, and the carriage is caused to reciprocate longitudinally of the guide bar, thus moving the hydration heads axially of the individual core voids. Setting liquid is fed under pressure to the hydration heads through the cross-head, the liquid being atomised on passage through the apertures in the hydration head and issuing from said heads as a downwardly directed spray.

The reciprocating motion of the hydration head must be at a constant velocity, if substantially equal wetting of the core void surfaces is to be achieved throughout the full range of movement of the hydration means.

In a typical drive means for the arrangement illustrated, power is provided by a reversing motor, not shown, the output shaft of the motor supporting a drive pulley over which extends a strap 19 connected with the carriage 11, the pulley and strap having complementary rib formations thereon to ensure a positive drive connection therebetween.

Whilst in the embodiment hereindescribed atomisation of the setting liquid is achieved by delivering the same under high pressure through a spray head, in an alternative arrangement the liquid is fed at low pressure and atomisation is effected by means of high pressure air with which the setting liquid is mixed at the outlet orifice, the liquid and air being delivered to the spray head through the respective parts of a coaxial tube arrangement.

Regarding the design of delivery tubes 14, these should be as light and as flexible as possible to minimise the structural connection between the nozzles and the supporting manifold 10. Extreme flexibility helps to dampen any shocks and vibration from the manifold as is traverses up and down, and allows the weight of the nozzle to pull the tube into a precise vertical line. The required properties are best provided by plastic rather than metal tubes, with the bore reduced to the minimum consistent with achieving adequate flow rates.

In contrast to the tubes, the nozzles should not be too light otherwise they will not provide the required stability from the plumb bob effect. With the small nozzle sizes normally used in the process, it is usually necessary to augment the weight by interposing a short length of thick walled metal tube between the nozzle and the plastic delivery tube.

For reliable operation it is also necessary to minimise oscillations generated by the movement of manifold 10, or by rhythmic pulses from the pump which pressurizes the hydration liquid. This required careful design of the pressure and manifold guidance systems.

Even with these precautions, it is usually necessary to limit any lateral oscillations that may occur by the guide 15. This stabilises the nozzles before each downstroke and prevents the cumulative build-up of lateral oscillations. The apertures 16 in the guide plate do not need to be a close fit round tubes 14, and the tubes should preferably run freely without touching the aperture sides—other than momentarily when restraining any slight lateral movement.

What is claimed is:

1. In apparatus for use in the manufacture of cored construction products formed from dry particulate materials and comprising a mould, a mould cavity defined by the mould, an elongate core former removably disposable within the mould cavity along a vertical axis thereof, and vibration means operable on the mould to compact or pre-compact dry particulate materials, and any fibres provided therein, present in the mould, and an hydration means adapted to apply setting liquid to a surface formed in the dry particulate material on withdrawal of the core former, the improvement wherein the hydration means comprising a freely suspended hydration head reciprocable along a path coincident with the vertical axis aforesaid and adapted to receive setting liquid from a supply thereof and deliver the same as a spray to the said surface.

2. Apparatus as claimed in claim 1, the reciprocable hydration head being suspended by a flexible small bore tube through which setting liquid is fed to the said head.

3. Apparatus as claimed in claim 2, the reciprocable hydration head being suspended from a cross-head mounted for reciprocable movement as aforesaid, the cross-head being adapted to receive setting liquid from a source thereof and the small bore tube being arranged in fluid flow connection with said cross-head.

4. Apparatus as claimed in claim 3 further including a carriage supporting the cross-head, and vertical slides with which the said carriage is engaged for reciprocable motion relative thereto.

5. Apparatus as claimed in claim 1, the improvement further including a guide means freely to receiving an element by which the reciprocable hydration head is suspended, the said guide means being located adjacent to the retracted position of the hydration head.

6. Apparatus as claimed in claim 5, wherein the guide means comprises an aperture plate.

7. Apparatus as claimed in claim 1, wherein the hydration head comprises a weighted nozzle.

8. Apparatus as claimed in claim 1 the improvement including a plurality of hydration heads suspended by respective flexible small-bore tubes from a common reciprocable cross-head.

9. Apparatus as claimed in claim 8, further including a guide means common to the plurality of hydration heads and including a corresponding plurality of apertures each to receive the flexible tube of a respective hydration head.

10. Apparatus for use in the manufacture of cored construction products formed from dry particulate materials and comprising a mould, a mould cavity defined by the mould, an elongate core former removably disposable within the mould cavity along a vertical axis thereof, vibration means operable on the mould to compact or pre-compact dry particulate materials, and any fibres provided therein, present in the mould and hydration means reciprocable along a path coincident with the vertical axis aforesaid the hydration means including an hydration head and a flexible small bore tube whereby the said hydration head is suspended within said mold cavity and through which setting liquid is supplied to the hydration head.

11. Apparatus as claimed in claim 10, including a cross-head from which the hydration head is suspended, a carriage supporting the cross-head and vertical slides with which the carriage is engaged for reciprocable motion relative thereto.

* * * * *